June 2, 1953 S. GILBERT ET AL 2,640,359
HIGH-SPEED STARTER
Filed Sept. 26, 1949

INVENTORS
SAMUEL GILBERT
CHARLES METSGER
BY Herbert Lom Dairy Jr.
ATTORNEY

Patented June 2, 1953

2,640,359

UNITED STATES PATENT OFFICE 2,640,359

HIGH-SPEED STARTER

Samuel Gilbert, Cedar Grove, and Charles Metsger, Morris Plains, N. J., assignors to Bendix Aviation Corporation, Teterboro, N. J., a corporation of Delaware Application September 26, 1949, Serial No. 117,762

4 Claims. (Cl. 74—7)

This invention relates to engine starters and more particularly to starters adapted for engines requiring a high cranking speed such as gas turbines.

With the advent of engines such as gas turbines that require a relatively high cranking speed, the conventional meshing means used in the low speed cranking have proven inadequate in that the starter jaws attain a high rate of speed before meshing thus causing an impact shock when the jaws mesh that is likely to cause serious damage to the starter and engine.

It is an object of this invention to overcome this disadvantage by providing novel meshing means that are in mesh at all times except when the engine is running above a predetermined speed.

A further object is to provide a starter in which the meshing means are controlled by the engine.

A further object is to provide an improved starter that may be easily modified to run in a reverse direction.

A further object is to provide an improved starter adapted for use with engines requiring a high cranking speed.

The above and other objects and features of the invention will appear more fully hereinafter from a consideration of the following description taken in connection with the accompanying drawing wherein one embodiment of the invention is illustrated by way of example. It is to be understood, however, that the drawings are for purposes of illustration only and are not designed as a definition of the limits of the invention.

Figure 2:
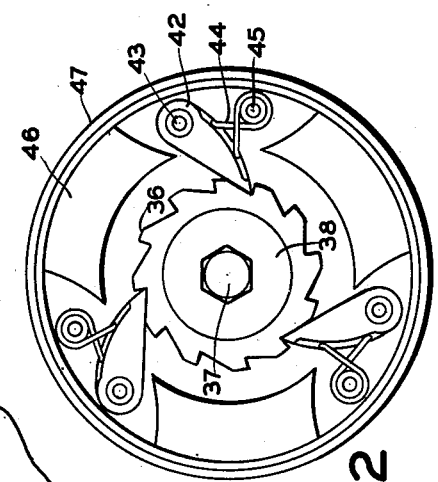
Figure 2 is a view along the line 2—2 of Figure 1.

Referring to the drawing, a starter is illustrated having a motor 5 as a source of driving power which may be any of the usual types employed for starters or any other suitable driving force may be used. The motor 5 has an armature shaft 6 journaled by a bearing 7 in end wall 8 of motor housing 9. Integral with the shaft 6 is a sun gear 10 adapted to engage planet gears 11. The planet gears 11 are journaled by bearings 12 on stub shafts 13 carried by a planet spider 14. The bearings 12 are held on the shafts 13 by a ring 15 secured by pins 16. The planet gears 11 also mesh with an annulus gear 17 formed by the inner discs 18 of an interleaved disc pack 19. Outer discs 20 are splined to a stationary annulus gear 21 which is secured against rotation by means of a circumferential flange 22 clamped between gear housing 23 and the motor housing 9 by studs 24 and nuts 25 or in any other suitable manner. Compression springs 26 bear against the disc pack 19 and are adjusted by a ring nut 27 to set the torque value of the disc pack.

The planet spider 14 is journaled by bearings 28 and 29 and is restrained from axial movement by end wall 8 and a shoulder 30 on gear housing 23. The spider 14 has a shaft 31 integral therewith and extending axially therefrom. The shaft 31 is journaled by bearing 32 mounted in transverse wall 33 of gear housing 23. An oil seal 34 is also mounted in the wall 33 in order to prevent oil from the engine from entering the gear and clutch housing 23.

Figure 1:
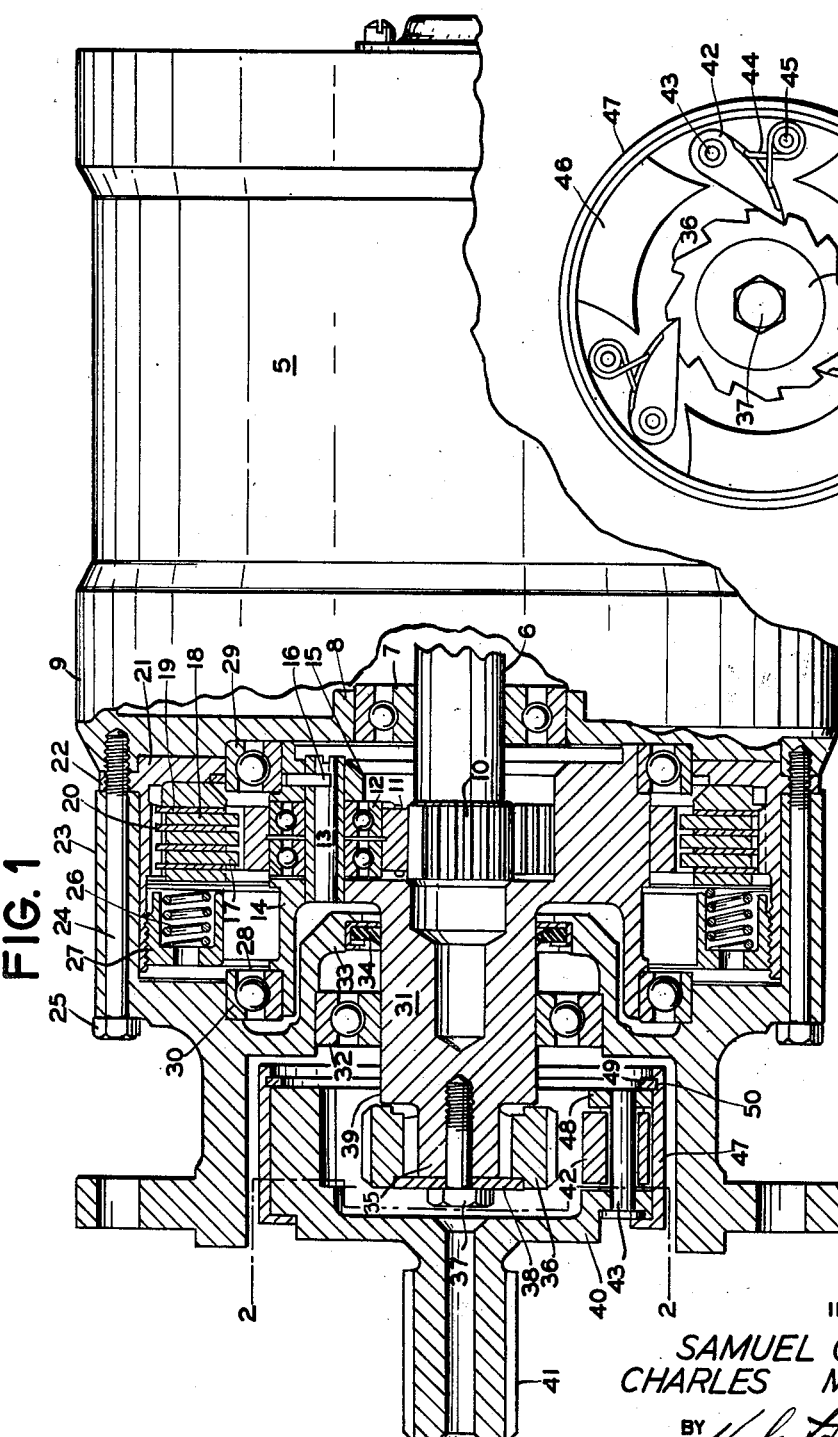
Figure 1 is a longitudinal section view of a device embodying the invention.

The shaft 31 terminates in an externally splined portion 35. A pawl dog 36 having internal splines adapted to mate with the splined portion 35 is held thereto by screw 37 and washer 38 holding the pawl dog 36 against flange 39. As illustrated in Figure 1, it is apparent that the pawl dog 36 is reversible and may be secured to the splined portion 35 facing in either direction.

Concentric with the pawl dog 36 is a pawl cage 40 having a splined portion 41 adapted to be secured to the engine member (not shown) of the engine to be started. A plurality of pawls 42 are mounted on post 43 carried by the pawl cage 40 and are adapted to engage the pawl dog 36. The pawls 42 are biased into engagement with the pawl dog 36 by springs 44 carried by post 45. Adjacent to each of the pawls 42 is a pawl stop 46 to limit the outward travel of the pawls 42. The pawls 42 and springs 44 are retained on the pawl cage 40 by means of an L-shaped ring 47, a retaining ring 48 and a split ring 49 fitted in a groove 50 of ring 47.

In operation when the motor 5 is energized, torque is transmitted to the pawl dog 36 through the planetary gearing and shaft 31. Inasmuch as the pawls 42 are in contact with the pawl dog 36 due to the spring bias, torque will be transmitted to the engine member through the pawl cage splines 41. Should the engine backfire or offer undue resistance to rotation, the disc pack 19 will slip thus protecting the starter against damage. When the turbine starts, the pawls 42 will ratchet on the pawl dog 36. However, when a predetermined speed of the turbine is reached, centrifugal force will overcome the bias of springs 44 and the pawls 42 will move outward from the pawl dog 36 to the pawl stop 46 thereby eliminating all ratcheting and drag of the starter mechanism. When the turbine rotation ceases, the springs 44 will move the pawls 42 into contact with the pawl dog 36 thus automatically engaging the starter for the next start.

In order to reverse the direction of rotation of the starter, the pawl dog 36 is reversed or replaced with one having teeth in the opposite direction and the pawls 42 and springs 44 are reversed. The post 43 and 45 are similar and the pawl stops 46 are so formed to permit operation of the pawls 42 from either direction.

Although only one embodiment of the invention has been illustrated and described, various changes in the form and relative arrangements of the parts may be made to suit requirements.

We claim:

1. In a starter for engines requiring a high cranking speed, the combination comprising driving means, a rotatable output member, a ratchet member carried thereby, said ratchet member being reversible and adapted to be carried facing in either direction, gearing means for operatively connecting said driving means to said output member, torque limiting means interposed between said driving means and said output member, a pawl carrier concentric with said output member and adapted to engage a shaft member of the engine to be started, a plurality of pairs of posts mounted on said carrier, a plurality of pawls pivotally mounted on one post of each of said pair of posts, spring means for biasing said pawls inward into engagement with said ratchet member, said spring means being mounted on the other of said posts, said pawls being responsive to a predetermined speed of rotation of said carrier to overcome said bias and move outward to disengage from said ratchet, and means to limit the outward movement of said pawls, said pawls and said springs being interchangeable to permit operation in either direction of rotation as determined by the direction said ratchet member is facing.

2. In a starter for a gas turbine, comprising, in combination, driving means, an output shaft, means including a torque limiting clutch for operatively connecting said output shaft to said driving means, a ratchet member faceable in either direction associated with said output shaft and adapted for rotation therewith, a pawl carrier concentric with said ratchet member and adapted for driving connection with said gas turbine, a plurality of uniformly spaced pairs of posts mounted on said pawl carrier, a plurality of pawls oscillatably secured to one of the posts in each of said pairs of posts, spring means secured to the other of said posts for urging said pawls inward into engagement with said ratchet member, said pawls and said spring means being interchangeable for rotation in either direction as determined by said ratcheted member, said pawls being responsive to speed of said gas turbine to overcome said bias to move outward at a predetermined speed, and means to limit the outward movement of said pawls.

3. In a starter for an internal combustion engine, driving means, a pawl dog member reversible to face in either direction, means including a torque limiting device for connecting said pawl dog member to said driving means for rotation therewith, an engine shaft member having a pawl cage concentric therewith, a plurality of pairs of posts on said cage and arranged concentric with said pawl dog, a plurality of pawls pivotally mounted on a corresponding post of each of said pairs of posts and adapted to engage said pawl dog member, spring means mounted on the other post of said pairs of posts for biasing said pawls inward into engagement with said pawl dog, said pawls and said spring means being adapted to be secured to either of said posts for selectively positioning for operation in either direction of rotation, said direction of rotation being determined by said pawl dog member, said pawls being responsive to the speed of rotation of said pawl cage to overcome said spring bias when said speed exceeds a predetermined maximum to disengage when said engine is running.

4. Engine meshing means for use in a starter adaptable for rotation in either direction, comprising a ratchet member reversible to face in either direction carried by said starter, a pawl carrier concentric with said ratcheted member and adapted for mounting on the engine to be started, a plurality of pairs of posts mounted on said carrier, a plurality of pawls pivotally mounted on one post of each pair of posts, spring means for biasing said pawls inward into engagement with said ratchet member, said spring means being mounted on the other of said posts, said pawls and said springs being interchangeable to permit operation in either direction of rotation as determined by said ratchet member, said pawls being responsive to a predetermined speed of rotation of said carrier to overcome said bias and move outward to disengage said pawls from said ratchet, and a pawl stop for each of said pair of posts, said pawl stop being symmetrical with each post of said pair of posts.

SAMUEL GILBERT.
CHARLES METSGER.

References Cited in the file of this patent

UNITED STATES PATENTS

| Number | Name | Date |
|---|---|---|
| 1,843,987 | Ragan | Feb. 9, 1932 |
| 2,204,750 | Conover | June 18, 1940 |
| 2,322,608 | Webster | June 22, 1943 |
| 2,349,867 | Heintz | May 3, 1944 |